United States Patent [19]
Kim et al.

[11] Patent Number: 5,745,361
[45] Date of Patent: Apr. 28, 1998

[54] POSITION CONTROL APPARATUS FOR MACHINE TOOL WITH FUZZY COMPENSATOR

[75] Inventors: Jong-Hwan Kim; Jeong-Yul Jeon, both of Daejon, Rep. of Korea

[73] Assignee: LG Industrial Systems Co., Ltd., Seoul, Rep. of Korea

[21] Appl. No.: 752,180

[22] Filed: Nov. 18, 1996

[30] Foreign Application Priority Data

Nov. 23, 1995 [KR] Rep. of Korea .................. 43158/1995

[51] Int. Cl.$^6$ .............................. G06F 19/00; G05B 13/02
[52] U.S. Cl. ........................ 364/148; 364/163; 364/176; 395/61; 395/900
[58] Field of Search ................................. 364/148, 152, 364/157, 160, 161, 162, 163, 176; 395/3, 61, 900, 903, 906, 13

[56] References Cited

U.S. PATENT DOCUMENTS

| | | | |
|---|---|---|---|
| 4,864,490 | 9/1989 | Nomoto et al. | 364/157 |
| 5,245,698 | 9/1993 | Matsunaga | 364/163 |
| 5,272,621 | 12/1993 | Aoki | 364/165 |
| 5,295,061 | 3/1994 | Katayama et al. | 364/157 |
| 5,404,289 | 4/1995 | Hang et al. | 364/148 |

*Primary Examiner*—Joseph Ruggiero
*Attorney, Agent, or Firm*—Oliff & Berridge, PLC

[57] ABSTRACT

A position control apparatus for a machine tool such as an SMD-mounter which is capable of moving a head to a desired position in as rapid a time as possible, by estimating a moving position of the head according to an evolutionary computation algorithm, and a friction of a guiding unit for guiding the head and the movement of the head.

6 Claims, 7 Drawing Sheets

|  |  | e(k) | | | | | | |
|---|---|---|---|---|---|---|---|---|
|  |  | NB | NM | NS | ZO | PS | PM | PB |
| $\Delta e(k)$ | NB | $\mu_1$ | $\mu_8$ | $\mu_{15}$ | $\mu_{22}$ | $\mu_{29}$ | $\mu_{36}$ | $\mu_{43}$ |
| | NM | $\mu_2$ | $\mu_9$ | $\mu_{16}$ | $\mu_{23}$ | $\mu_{30}$ | $\mu_{37}$ | $\mu_{44}$ |
| | NS | $\mu_3$ | $\mu_{10}$ | $\mu_{17}$ | $\mu_{24}$ | $\mu_{31}$ | $\mu_{38}$ | $\mu_{45}$ |
| | ZE | $\mu_4$ | $\mu_{11}$ | $\mu_{18}$ | $\mu_{25}$ | $\mu_{32}$ | $\mu_{39}$ | $\mu_{46}$ |
| | PS | $\mu_5$ | $\mu_{12}$ | $\mu_{19}$ | $\mu_{26}$ | $\mu_{33}$ | $\mu_{40}$ | $\mu_{47}$ |
| | PM | $\mu_6$ | $\mu_{13}$ | $\mu_{20}$ | $\mu_{27}$ | $\mu_{34}$ | $\mu_{41}$ | $\mu_{48}$ |
| | PB | $\mu_7$ | $\mu_{14}$ | $\mu_{21}$ | $\mu_{28}$ | $\mu_{35}$ | $\mu_{42}$ | $\mu_{49}$ |

FIG. 8

POSITION CONTROL APPARATUS FOR MACHINE TOOL WITH FUZZY COMPENSATOR

BACKGROUND OF THE INVENTION

1. Field of the Invention

The present invention relates to a position control apparatus for a machine tool such as a surface mounting device (SMD) mounter, and more particularly, to an improved position control apparatus for a machine tool which is capable of moving a head thereof to a desired position in as rapid a time as possible, by estimating a moving position of the head according to an evolutionary computation algorithm, and a friction of a guiding unit for guiding the head and the movement of the head.

2. Description of the Prior Art

Figure 1:
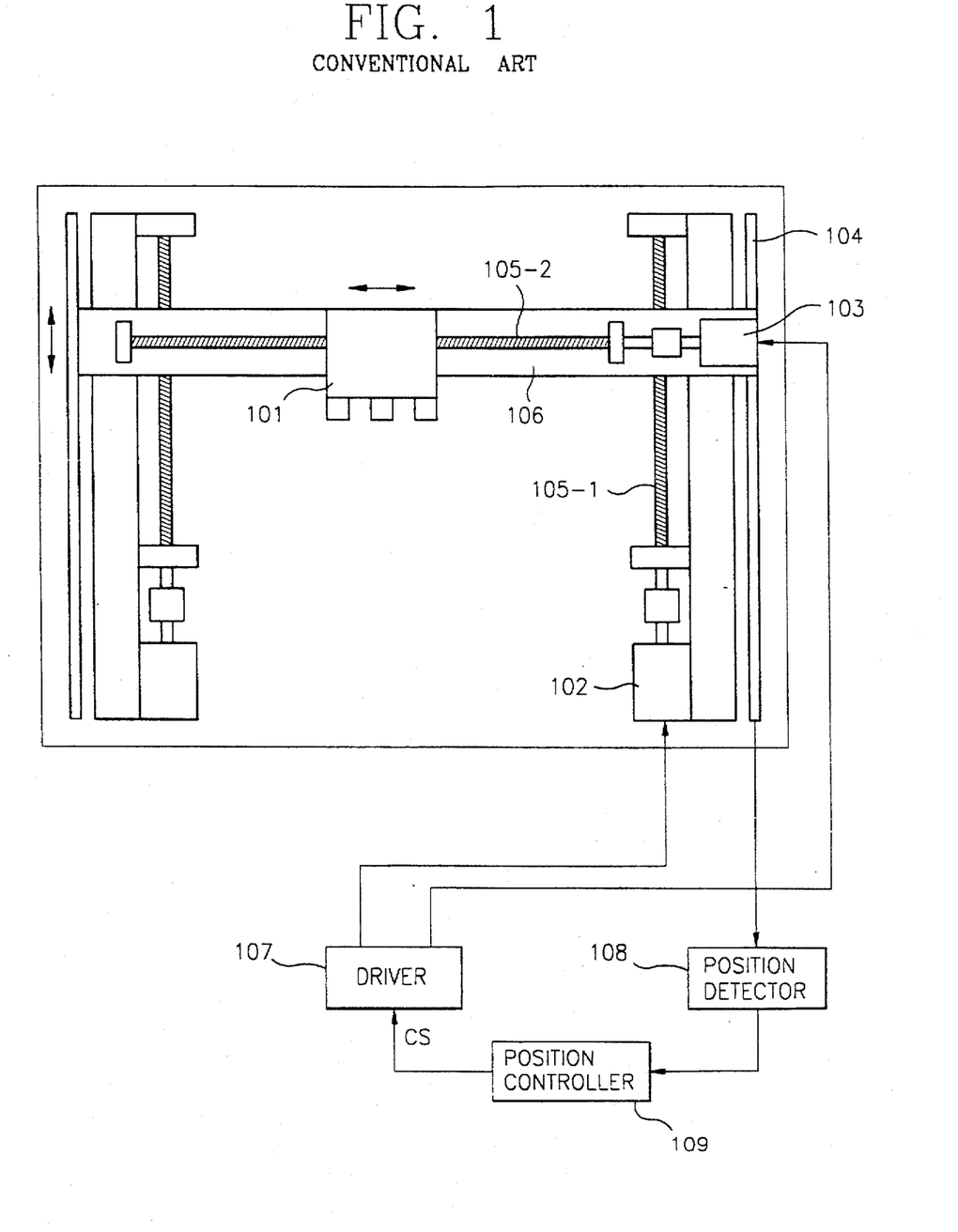
FIG. 1 is a view showing the construction of an X-Y table used for an SMD-mounter according to the conventional are.

FIG. 1 is a view showing the construction of an X-Y table which is used for an SMD-mounter. As shown in this drawing, the X-Y table includes a first driving motor 103 for horizontally moving a head unit 101 by rotating a second ball screw 105-2 having the head unit 101 mounted thereon, a second driving motor 102 for vertically moving the head unit 101 by rotating a second ball screw 105-1, a driver 107 for driving the first and second driving motors 103, 102, a rotation detector 104 for detecting a rotation of the first and second driving motors 103, 102 a position detector 108 for detecting a moving position of the head unit 101, and a position controller 109 for receiving an output from the position detector 108 and outputting a control signal (cs) to the driver 107 to control the driving of the first and second driving motors 103,102.

The operation of the position control apparatus for a machine tool will now be described in detail.

When a device is no be mounted on a circuit board (not illustrated), the position controller 109 outputs a control signal to the driver 107, and the driver 107 supplies a current and a voltage controlled by the control signal (cs) to the first and second driving motors 103, 102. The ball screws 105-2, 105-1 are rotated, geared with a rotation of the first and second driving motors 103, 102, and as a result, the head unit 101 is moved to a position where a device supplier is located so that the head receives the device.

Then, when a control signal (cs) from the position controller 109 is outputted, the above-described operation is repeated to move the head unit 101 to a position over the circuit board where the device is to be mounted.

While the head unit 101 is moved, the rotations of the first and second driving motors 103, 102 are detected by the rotation detector 104, and the position detector 108 counts an output pulse signal from the rotation detector 104 to detect the position of the head unit 101. The position controller 109 judges a moving speed of the head unit 101 to control the driver 107 and to move the head unit 101 to a desired position.

Figure 2:
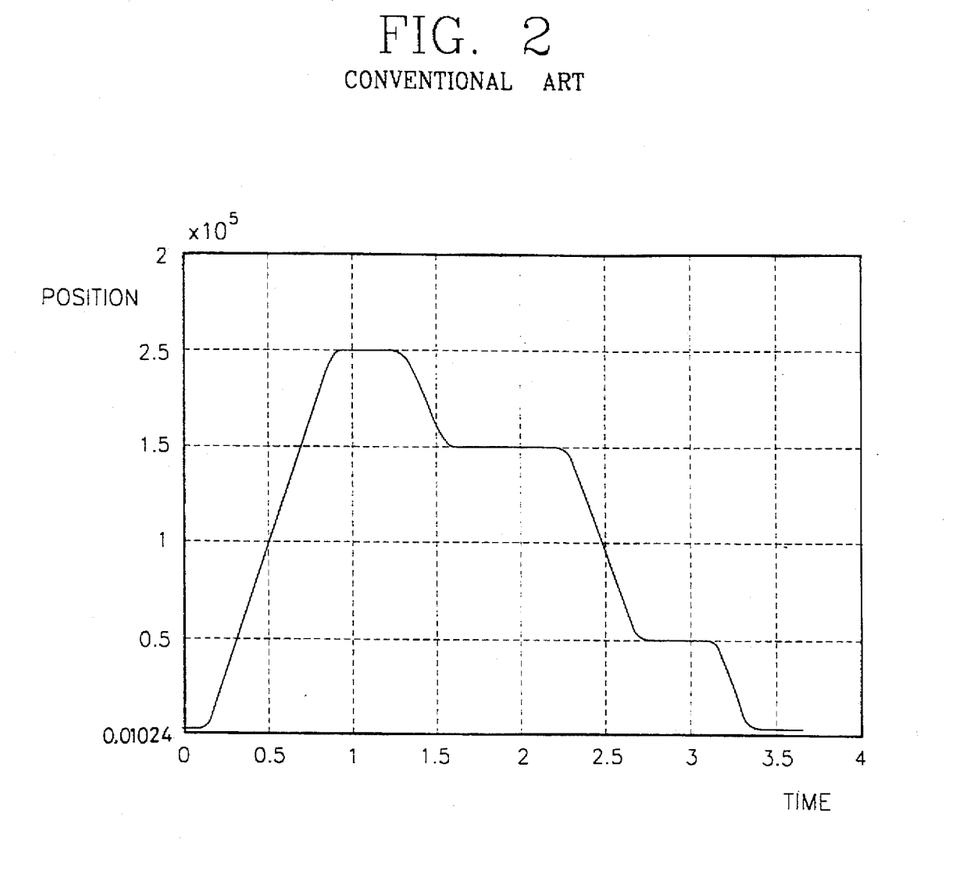
FIG. 2 is a graph showing the vertical or horizontal lineal moving distance of a head unit in FIG. 1 with respect to time.

FIG. 2 is a graph showing a vertical or horizontal moving distance of the head unit 101 with respect to time, and the head unit 101 starts to move from a position of 1024 μm along an axis to positions therealong of 200,000 μm, 150, 000 μm and 150,010 μm, respectively and then return to the position 1024 μm.

The most important factor in the performance of the position control apparatus is that the head unit 101 is moved to a desired position in as rapid a time as possible.

Therefore, even though the speed of the driving motor is increased, a position error occurs due to an overshoot where the head unit passes by a desired position, and since the position error must be controlled again, the head unit disadvantageously cannot be moved to a desired position in a desired rapid time without any error.

In addition, friction occurs in the contacting portion where the ball screw 105-2 contacts with the head unit 101. The operational characteristics of the friction sensitively changes according to the condition of the frictional surfaces, a variation of the load, and a lubricant.

The friction is an essential quality in a brake system, but is an unnecessary one to the servo control system. In particular, in case off a machine tool requiring a high precision, it is one of the most obstructive elements.

For example, unless the friction represented by a nonlinear function of a relative speed between two objects in the servo control system is considered, a steady state error occurs and stick & slip phenomenon occurs when the object moves and stops.

SUMMARY OF THE INVENTION

Accordingly, a prime object of the present invention is to carry out an optimum control by performing a proportional derivative control after generating a fuzzy regulation by using an evolutionary computation algorithm.

Another object of the present invention is to estimate a dynamic parameter of the friction and thereby to compensate for the friction according to the evolutionary computation algorithm, resulting in improving the efficiency of position controls.

To achieve the above objects, there is provided an improved position control apparatus for a machine tool which includes a pre-unit fuzzy compensator for receiving an output signal from the system and outputting a fuzzy-compensated signal according to an evolutionary computation algorithm, a proportional-derivative controller for receiving the fuzzy-compensated output signal and the output signal from the system and performing a proportional-derivative control, a friction compensator for receiving the output signal from the system to operate a parameter with respect to the friction, estimating the friction of the system from the parameter according to the evolutionary computation algorithm and compensating for it, and an actuator for multiplying a desired torque value outputted from the friction compensator by a predetermined coefficient to obtain a control signal and applying the control signal to the system.

The friction compensator includes a parameter estimating unit for receiving an output signal from the system and estimating a parameter of the friction, and a friction controller for comparing the output from the system calculated by the friction determined by the estimated parameter with the actual output from the system and for outputting a signal to reduce an error generated by the comparison result according to the evolutionary computation algorithm.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings.

Figure 3:
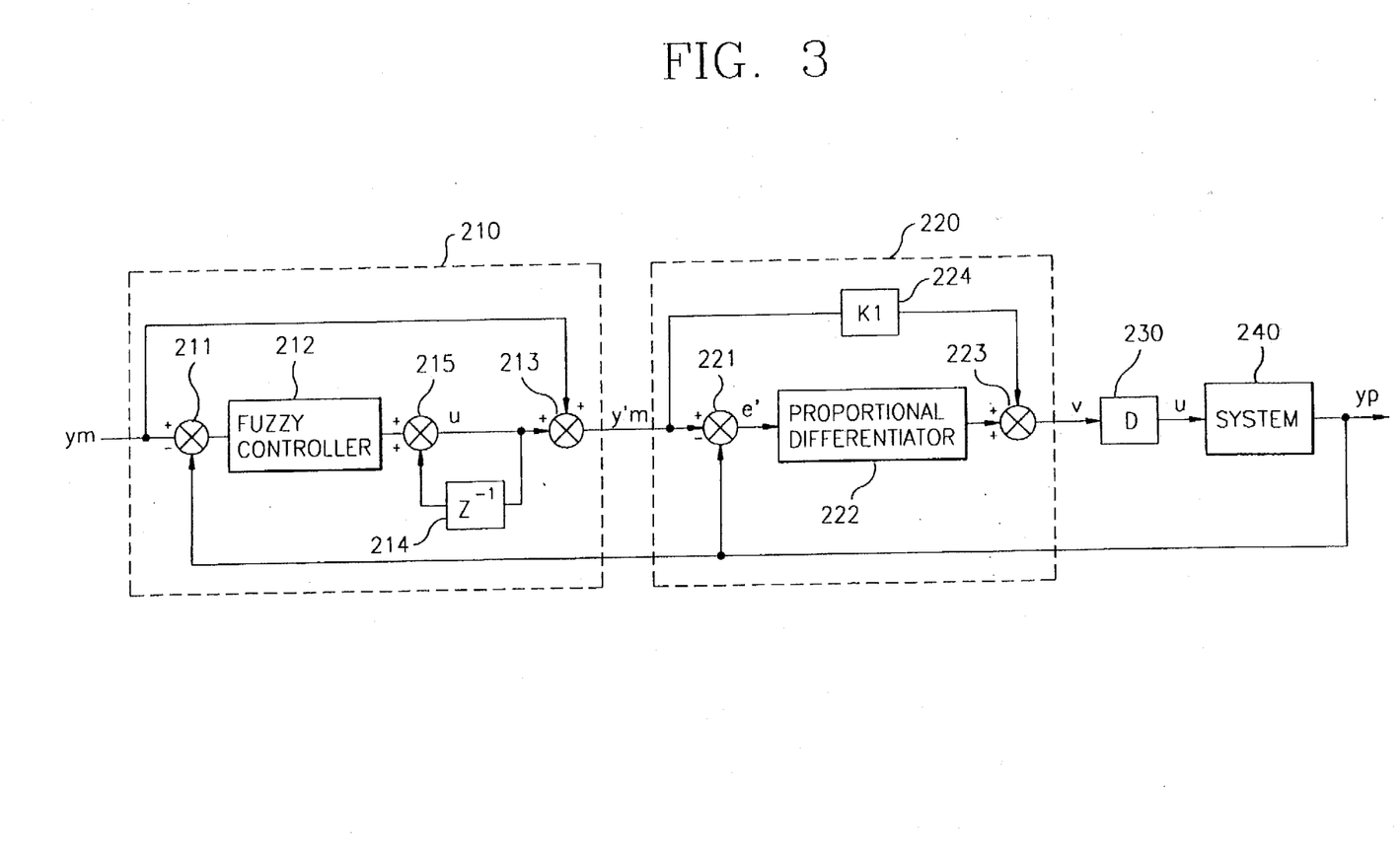
FIG. 3 is a schematic diagram showing the construction of a first embodiment of a position control apparatus according to the present invention.

FIG. 3 is a schematic diagram of a position control apparatus according to a first embodiment of the present invention, wherein the designated system 240 indicates the remaining part except for the position controller 109 in FIG. 1. Therefore, the output signal yp(k) represents the output from the position detector 108.

As shown in this drawing, the position control apparatus according to the present invention includes a pre-unit fuzzy compensator 210 for outputting a fuzzy-compensated signal ym'(k) according to an evolutionary computation algorithm after obtaining an error (e) and a changing rate of the error $\Delta e(k)$ from an input signal ym(k) and the output signal yp(k) from the system 240, a proportional-derivative controller 220 for carrying out a proportional-derivative control and outputting a desired torque value v(k) after obtaining an error e'(k) from the output signal ym'(k) from the pre-unit fuzzy compensator 210 and the output signal yp(k) from the system 240, and an actuator 230 for multiplying the desired torque value v(k) by a predetermined coefficient to obtain a control signal Du(k) and outputting the control signal Du(k) to the system 240.

The pre-unit fuzzy compensator 210 includes a first subtractor 211 for obtaining an error e(k) between the input signal ym(k) and the output signal yp(k) from the system 240, a fuzzy controller 212 for performing a fuzzy control and outputting a compensating value μ(k) according no an evolutionary computation algorithm after determining a changing rate $\Delta e(k)$ of nine error e(k), a delay 214 for delaying the compensating value μ(k) of the fuzzy controller 212 for one sampling period, a first adder 215 for adding the compensating value μ(k) from the fuzzy controller 212 to the compensating value μ(k−1) delayed by the delay 214, and a second adder 213 for adding an output from the first adder 215 and the input signal ym(k) to output a compensating signal ym'(k) co the proportional-derivative controller 220.

The proportional-derivative controller 220 includes a second subtractor 221 for obtaining an error e'(k) between the output signal yp(k) from the system 240 and the compensating signal ym'(k) from the pre-unit compensator 210, an amplifier 224 for multiplying the compensating signal ym'(k) by a gain (K1), a proportional differentiator 222 for obtaining a changing race $\Delta e'(k)$ of the error from the error e'(k) and control signals C[e'(k), $\Delta e'(k)$] by performing a proportional derivative control, and a third adder 223 for adding an output Klym'(k) from the amplifier 224 to the control signals C[e'(k),$\Delta e'(k)$] to obtain a desired torque value v(k) for a position control.

The operation of the position control apparatus according to the present invention will now be described in detail.

An output signal yp(k) from the system 240 which is a signal in accordance with a driving of the first and second driving motors 103, 102 is fed back and inputted to the first subtractor 211 in the pre-unit compensator 210 and the second subtractor in the proportional derivative controller 220.

An error (ym-yp) between the input signal ym(k) and the output signal yp(k) from the system which is a command signal in accordance with a desired value is obtained from the calculator 211 in the pre-unit fuzzy compensator 210. The fuzzy controller 212 obtains a rate of change $\Delta e(k)$ (e(k)-e(k-1)) between the error e(k) and the error e(k-1) obtained during the previous one sampling period to obtain the compensating value μ(k) by performing a calculation with the following fuzzy control regulation.

$$\mu(k)=F[e(k), \Delta e(k)]$$

The above fuzzy control regulation includes a course of becoming fuzzy, a course of judging by a fuzzy logic and a non-fuzzy course, wherein the course of judging by a fuzzy logic comprises an antecedent part and a consequent part, and a regulation connecting these two parts.

According to the present invention, seven language variables (L) of the antecedent part are set as follows;

$$L=\{NB, NM, NS, ZO, PS, PM, PB\}$$

Figure 4:
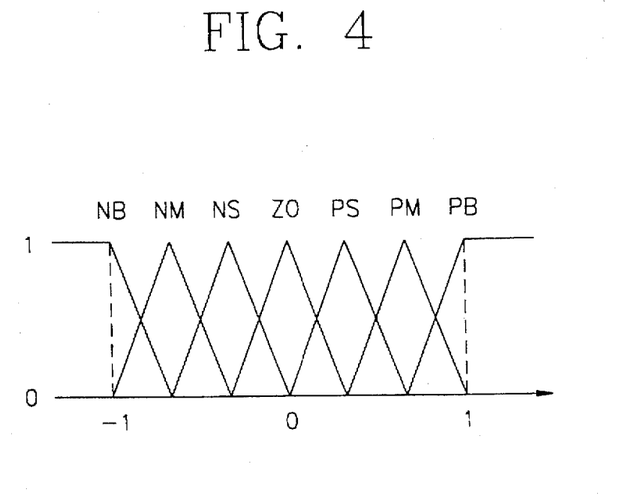
FIG. 4 is a graph showing a fitness function M of a fuzzy regulation in FIG. 3.

A fitness function (M) is also set as follows, shown in FIG. 4;

$$M=\{M_{NB}, M_{NM}, M_{NS}, M_{ZO}, M_{PS}, M_{PM}, M_{PB}\}$$

wherein N represents negative, P positive, B big, M medium, S small and ZO zero.

First, the course of being fuzzy is a course that the error e(k) and the rate of a change $\Delta e(k)$ are assigned to the language variables, and in accordance with the language variables (l) (l∈L) and the related fitness function ($M_l$), the inputs (e(k), $\Delta e$ (k)) are set to be the following variables ($n_e(l)$, $n_{\Delta e}(l)$). Here, $C_e$ and $C_{\Delta e}$ indicate multiplying factors.

$$n_e(l)=M_l(C_e e\ (k))$$

$$n\Delta_e(l)=M_l(C_{\Delta e}\Delta e\ (k))$$

Figure 5:
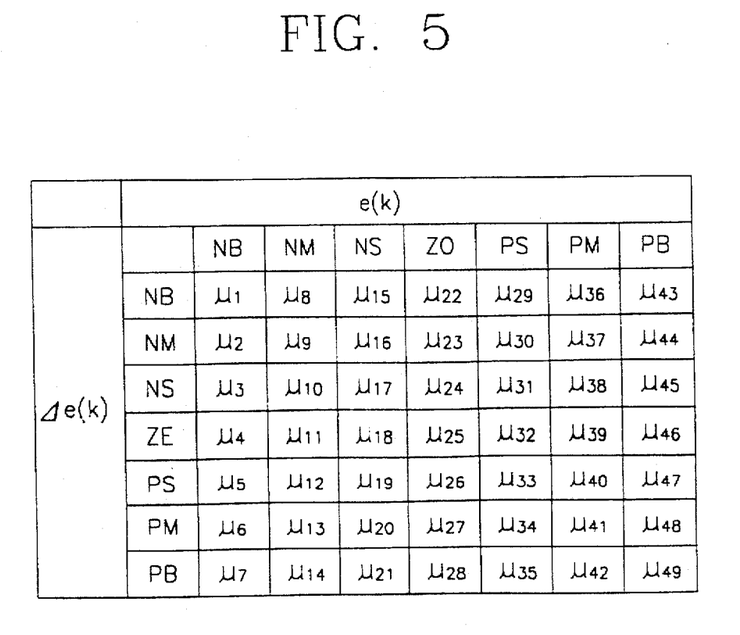
FIG. 5 is a graph showing a computation regulation of a pro-unit fuzzy compensator in FIG. 3.

Then, in the course of judging by the fuzzy logic, the see of fuzzy regulations is represented as R={R1, R2, ..., R49 }, and each regulation Ri, i=1, ..., 49 is expressed as (NS, PS, μi), using three variables which have the relation of $l_e$, $l_{\Delta e}$, $l_\mu \in$ L to be ($l_e$, $l_{\Delta e}$, $l_\mu$). As shown in FIG. 5, a regulation of the pre-unit fuzzy compensator 210 is determined by giving an arbitrary value of a real number to each μi.

The regulations are expressed like: "if e(k) is $L_e$ and $\Delta e(k)$ is $l_{\Delta e}$, then μi is $l_\mu$."

Each regulation Ri=($l_e$, $l_{\Delta e}$,$l_\mu$) is represented as the following function $p_i$[e(k), $\Delta e$ (k)] with given inputs (e(k) and $\Delta e(k)$):

$$p_i=[e(k),\Delta e(k)]=\min(n_e(l_e), n_{\Delta e}(l_{\Delta e}))$$

The function $p_i, i=1, \ldots, 49$ is combined to obtain the following entire function (q):

$$q(e(k), \Delta e(k), \mu) = \max(p_1(e(k), \Delta e(k), \mu_1), \ldots, p_{49}(e(k), \Delta e(k), \mu_{49}))$$

The non-fuzzy course is a course where the result of the judging course by the fuzzy logic is changed to an actual output no obtain an output function F represented by the following equation, wherein $C_F$ represents a multiplying factor.

$$F[e(k), \Delta e(k)] = C_F \frac{\sum_{i=1}^{49} \mu_i q(e(k), \Delta e(k), \mu_i)}{\sum_{i=1}^{49} q(e(k), \Delta e(k), \mu_i)}$$

The compensating value $\mu(k)$ obtained in the fuzzy controller 212 is delayed ($\mu(k-1)$) for one sampling period the delay 214 and the delayed compensating value $\mu(k-1)$ is added to the next compensating value $F[e(k), \Delta e(k)]$ in the first adder 215 to output a new compensating value as follows;

$$\mu(k) = F[e(k), \Delta e(k)] + \mu(k-1)$$

The compensating value [$\mu(k)$] is added to the input signal ym in the second adder 213 to be outputed as the output ym' (k) which is a fuzzy-compensated output signal outputted from the pro-unit fuzzy compensator 210.

$$ym'(k) = ym(k) + \mu(k)$$

The fuzzy-compensated output signal ym' (k) is added to the output signal yp(k) from the system 240 in the second subtractor 221 in the proportional-derivative controller 220 to obtain an error e' (k).

The proportional differentiator 222 obtains the rate of change $\Delta e'(k)(e'(k)-e'(k-1))$ of the error e' (k) from the previous error e' (k-1), and obtains the control signals C[e' (k), $\Delta e'(k)$] by performing the proportional-derivative control as follows:

$$C[e'(k), \Delta e'(k)] = K_p e'(k) + K_p \Delta e'(k)$$

Here, according to the size of the position error, the Gain Scheduling technique whereby the coefficient of the proportional differentiator 222 is converted into a predetermined value is used for a precise control.

The signal ym' (k) is multiplied by the gain (K1) in the amplifier 224, and the control signals [e' (k), $\Delta e'(k)$] are added in the third adder 223 to the signal K1ym' (k) outputted from the amplifier 224 to output a desired torque value v(k).

$$v(k) = K1ym'(k) + C[e'(k), \Delta e'(k)]$$

The desired torque value v(k) is supplied to the actuator 230, and the actuator 230 multiplies the desired torque value v(k) by a coefficient (D) to obtain and output a control signal Dv(k) to the system 240. Then the driver 107 in FIG. 1 controls the first and second driving motors 103, 102, and thereby the head unit 101 is moved to a desired position.

Figure 7:
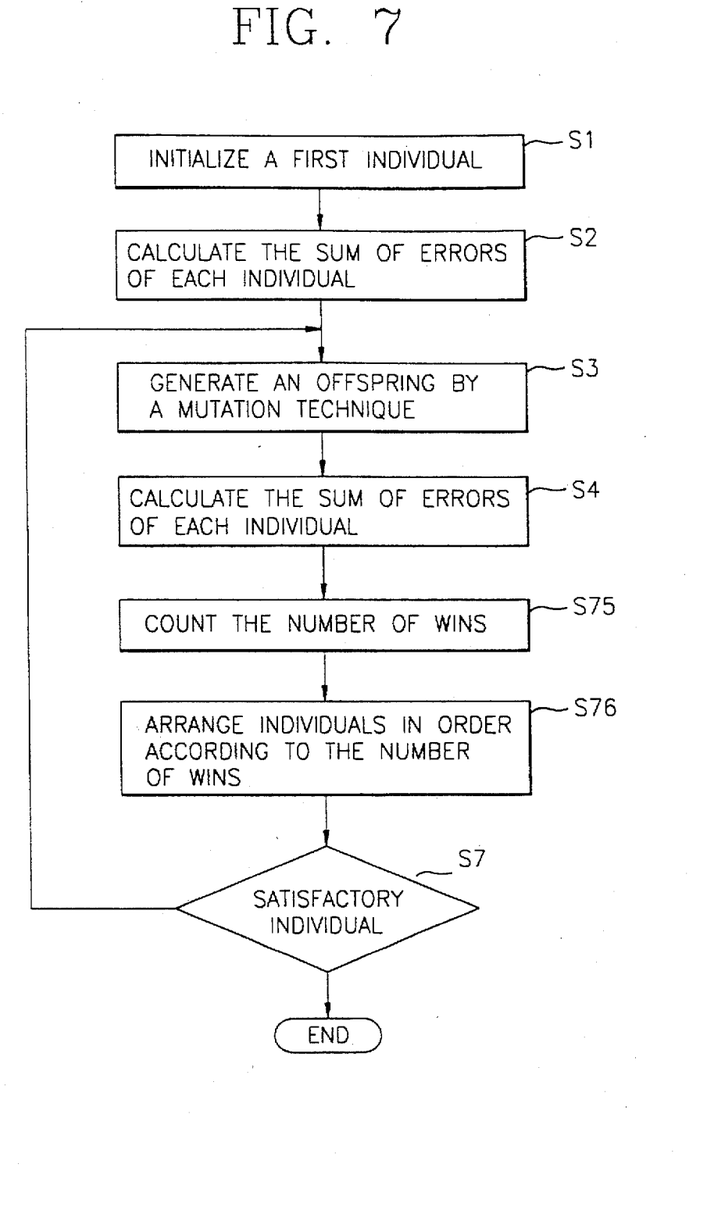
FIG. 7 is a flow chart showing an evolutionary programming and an evolution strategy method of looking for a regulation of the pre-unit compensator of FIG. 3.
Figure 8:
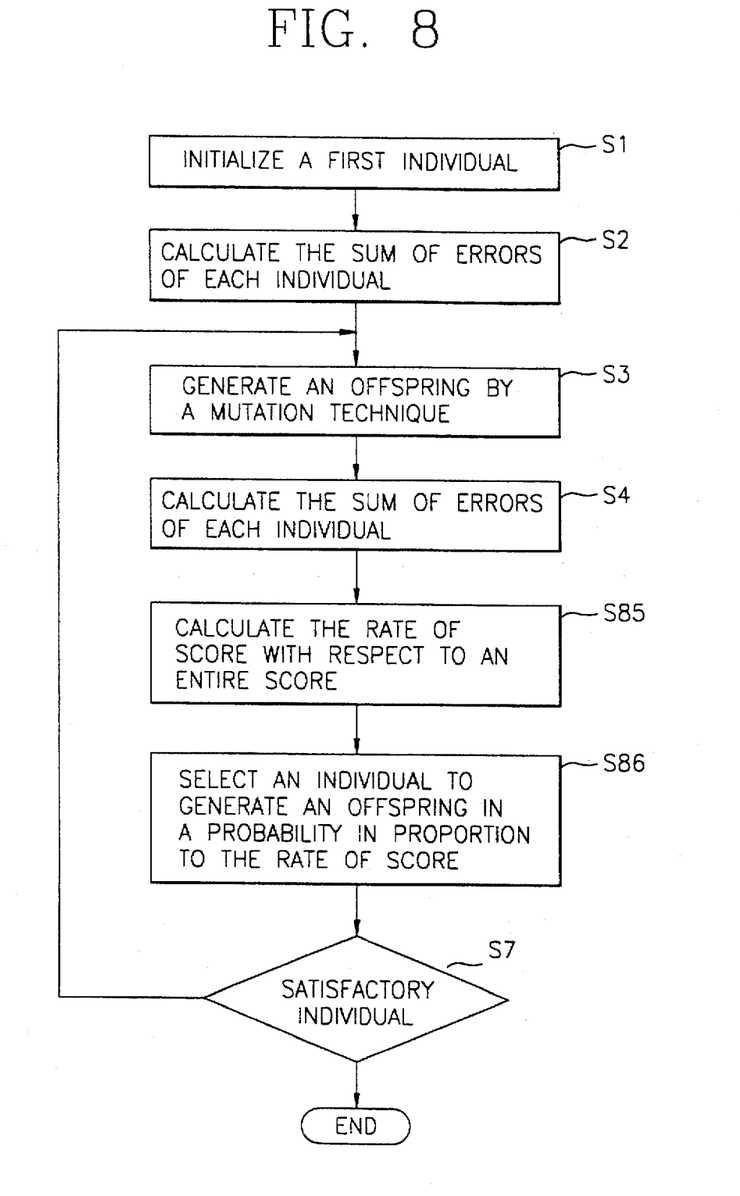
FIG. 8 is a flow chart showing a genetic algorithm method of setting a regulation of the pre-unit compensator of FIG. 3.

With reference to FIGS. 7 and 8, the method of setting a fuzzy regulation in the course of judging by the fuzzy logic by adopting an evolutionary computation algorithm including a genetic algorithm, an evolution strategy, and an evolutionary programming will now described in detail.

First, in the first step (s1), a vector which is a first individual (parent) is initialized.

That is, an individual variable $X_i = [\mu_2, \mu_2, \ldots, \mu_{49}]^T$ of a vector $(\vec{X}_i, \vec{\sigma}_i)$, $\forall_i \in \{1, \ldots, N\}$ having the value of consequent part $\mu_i$, $\forall_i \in \{1, \ldots, 49\}$ is generated.

Here, the vectors $(\vec{X}_i, \vec{\sigma}_i)$ have a value of a real number in case of the evolutionary programming or the evolution strategy, and are strings represented as an appropriate number of bits in case of a genetic algorithm.

In the second step(s2), the sum ($\phi$) of the errors of each individual variable which is a scoring of all vectors is obtained. A fitness score of each individual variable $\vec{X}_i$, $\forall_i \in \{1 \ldots, N\}$ is calculated on the basis of the fitness function $\phi(\vec{X}_i)$ in case of the evolutionary programming or the evolution strategy, and the fitness score thereof is calculated by adopting an inverse number of the value of fitness function $\phi(\vec{X}_i)$ in case of a genetic algorithm.

$$\phi(\vec{X}_i) = \sqrt{\sum_k (y_m(k) - y_p(\vec{X}_i, k))^2}$$

Here, $Y_p(\vec{X}_i, k)$ is an output from the system when an individual variable $\vec{X}_i$, $\forall_i \in \{1, \ldots, N\}$ is used as the regulation of the pro-unit compensator 210, and $Y_m(k)$ is a standard output.

In the third step (s3), the initial individual variable generated in the first step (s1) serves as a parent to generate an offspring.

That is, the offspring $(\vec{X}_i, \vec{\sigma}_i)$, $\forall_i \in \{1, \ldots, N\}$ are generated from the parent individual variables $(\vec{X}_i, \vec{\sigma}_i)$, $\forall_i \in \{1, \ldots, N\}$.

In case of the evolutionary programming and the evolution strategy, the offspring is generated by adding a random value to the parent individual variable as follows;

$$\vec{X}_i'(j) = \vec{X}_i(j) + \vec{\sigma}_i(j) N_j(0,1)$$

$$\vec{\sigma}_i'(j) = \vec{\sigma}_i(j) \exp(\tau') N(0,1) + \tau N_j(0,1)) \forall_i \tau \{1, \ldots, N\}$$

Here $\vec{X}_i'(j) = \vec{X}_i(j)$, $\vec{X}_i'(j)$, $\vec{\sigma}_i(j)$, $\vec{\sigma}_i$, (j) are the j-th article of each vector of $\vec{X}_i'$, $\vec{X}_i$, $\vec{\sigma}_i$, $\vec{\sigma}_i'$.

N(0,1) represents one-dimensional gaussian probability variable having an average value of "0", and a standard deviation of "1", and $N_j(0,1)$ is a value obtained when the j-th article is calculated, and $\tau$ and $\tau'$ are $$\left(\sqrt{2\sqrt{n}}\right)^{-1}, (\sqrt{2n})^{-1},$$

respectively.

In case of the genetic algorithm, a crossover for cutting an appropriate point of the siring of the parent individual with an appropriate probability and exchanging it with another parent individual and a mutation technique for toggling bits more than one in an appropriate probability are employed to generate an offspring.

in the fourth step, using the offspring generated in the third seep (s3) as an individual, the scoring of the vector is carried out in the same way as the second step (s2).

In the fifth step, the number of wins is calculated according to the score with respect to each offspring and parent obtained from the fourth step(s4).

In the case of the evolutionary programming, the number of each win is counted while the object having a small score is counted as a win along with a probable selection of the comparing object of the scoring, and in the case of the evolution strategy, the number of wins is counted by comparing the scorings with respect to all individual s except for the corresponding object(s75).

In the case of the genetic algorithm, the inverse number of the score is obtained with respect to the entire individual, and then the sum of the inverse numbers is obtained. Then, the rate is obtained with respect to the sum of the inverse number of the corresponding score and the inverse number of the entire number(s85).

In the sixth step, in the case of the evolutionary programming and the evolution strategy, according to the result of the fifth step (s75), all individual s are arranged in an order of the number of wins to choose about half (s76), and in the case of the evolutionary algorithm, an individual is chosen to generate an offspring by probability proportional to the rate obtained from the above step (s86).

In the seventh step(s7), the individual selected in the sixth step (s76) (s86) is judged as whether or not it is satisfactory or not. As a result, if it is satisfactory, the step is finished, but if it is not, the third-step (s3) is repeated until the satisfactory individual is obtained, the third simp (s3) is repeated.

Then, when the friction between the moving unit and the guide occurs in case the head unit 101 in FIG. 1 is moved, the evolutionary computation algorithm is used to estimate a dynamic parameter of the friction, and the apparatus for compensating for the friction by using the dynamic parameter will now be described in detail with reference to FIG. 6.

Figure 6:
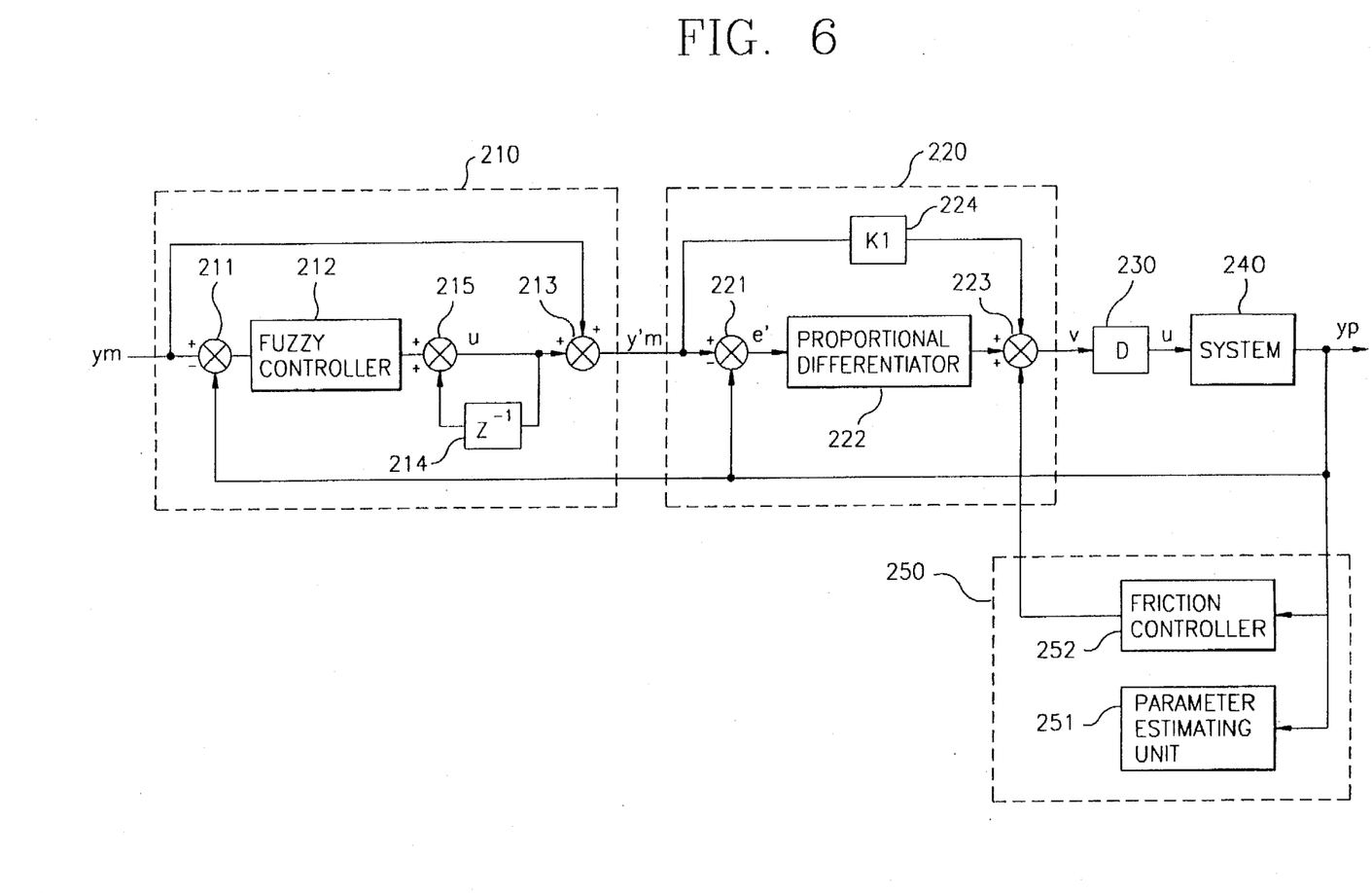
FIG. 6 is a schematic view showing the construction of a second embodiment of the position control apparatus according to the present invention.

FIG. 6 is a schematic diagram showing a position control apparatus according to a second embodiment of the present invention, wherein a friction compensator 250 is added to the apparatus in FIG. 3.

The friction compensator 250 includes a parameter estimating unit 251 for estimating a parameter of the friction, and a friction controller 252 for comparing an output from the system calculated by the friction determined by the estimated parameter and an actual output from the system to output a signal for reducing an error generated by the comparison result.

The operation of the remaining elements except for the friction compensator 250 is identical to that of FIG. 3. Therefore, only the operation of the friction compensator will now be described.

First, a movement equation with respect to the movement of an arbitrary axis is set as follows when the head unit 101 is moved horizontally or vertically:

$$m\ddot{x}(t)+F_f(\bullet)=F_u(t)$$

Here m represents an equivalent mass, x displacement, $F_u(t)$ a control input, and a $F_f(\bullet)$ a friction.

The friction $F_f(\bullet)$ is modeled as a static friction, a coulomb friction and a viscous friction, but according to the present invention, a friction model is introduced having seven parameters in which the characteristics of the friction identified by many studies in lubrication engineering are combined.

First, when no friction occurs, a physical phenomenon occurs where a spring effectively exists between two objects, which is called a pre-sliding displacement, and here the friction can be shown as follows:

$$F_f(x)=k_t x$$

When an object is moved, that is, when the slip occurs, the equation can be expressed as follows:

$$F_f(x,t) = (F_c + F_v|\dot{x}| + F_s(\gamma, t_2)) \frac{1}{1+\left(\frac{x(t-\tau_L)}{\dot{x}_s}\right)^2} \text{sgn}(\dot{x})$$

Here, $F_s(\gamma, t_2)$ represents a rising static friction, and this can be represented as follows:

$$F_s(\gamma, t_2) = F_{s,a} + (F_{s,\infty} - F_{s,a}) \frac{t_2}{t_2 + \gamma}$$

$F_c$ represents a coulomb friction, $F_v$ a viscous friction, $F_s$ a Stribeck friction, and $F_{s,a}$ a Stribeck friction of the static moment in the previous step, $F_{s,\infty}$ a Stribeck friction after a long static condition, $k_t$ a stiffness in a static condition, $\dot{x}_s$ a characteristic speed of the Stribeck friction, $\tau_L$ a friction delaying time, $\gamma$ a parameter of an increasing static friction, $t_2$ a dwell mime, and X a relative displacement.

Of a plurality of parameters used in the model, seven parameters as follows are estimated:

$$F_c, F_v, F_{s,\infty}, k_t, \dot{X}_s, \tau_L, \gamma$$

Eight parameters including an equivalent mass (m) of the system and the seven parameters are estimated to be a parameter vector z as follows;

$$z=[m, F_c, F_v, F_{s,\infty}, k_t, \dot{x}_s, \tau_L, \gamma]^T, z \in \mathbb{R}^8$$

So far, the operation of the parameter estimating unit 250 has been described, and using an evolutionary computation algorithm, the operation of the friction controller 252 for minimizing an estimated error will now be described.

The estimated error (ep) is defined as follows from the estimated parameter vector z:

$$e_p(\vec{z}, t_i) = x_p(\vec{z}, t_i) - x_m(\vec{z}, t_i), i=1,2,\ldots,N_s$$

Here, $N_s$ represents the usual number of samples, $X_p(\vec{z}, t_i)$ an actual output from the system in a sampling period $t_i$ having the parameter vector z as a variable, and $X_m(z, t_i)$ an output of a mathematical model determined by an estimated parameter having the parameter vector z as a variable.

$N_s$ samples must be collected so that the characteristic of each parameter can be revealed clearly. The parameters having a close relation to speed are $F_c, F_v, F_{s,\infty}, \dot{x}_s$, and to reflect these parameters, data must be collected experimentally at having each different fixed speed, and the collection of data in which a movement and static condition exist is required to have a parameter having a relation to a characteristic in a dwell time.

Then, an evaluation function $Je(\vec{z})$ is defined as follows with the estimated error($e_p$).

$$J_e(\vec{z}) = \sum_{i=1}^{N_s} e_p^2(\vec{z}, t_i)$$

As an optimum method for minimizing the evaluation function $J_e(x)$, an evolutionary computation algorithm is adopted, which is an identical method no that adopted in the fuzzy controller 212 in the pre-unit compensator 210. The method will now be described in detail with reference to FIGS. 7 and 8.

First, in the first step (s1), an initial individual variable is formed by determining $N_p$ vectors at random.

In the second step (s2), with respect to the initial parent individual generated in the first step (s1), each evaluation function is calculated by using given evaluation samples to take as a score. Here, the evaluation samples include the data obtained through several experiments and the data obtained from a mathematical calculation.

In the third step (s3), a mutation technique is adopted from the $N_p$ parent individual s to generate $N_p$ offspring individual s, and in the case of the evolutionary programming, it can be represented as follows:

$$\vec{z'}_i = \vec{z}_i + N(0, \sigma_i) \quad \sigma_i = \beta J_s(\vec{z}_i), i=1, \ldots, N_p$$

Here, $\sigma_i$ represents a standard deviation proportional to the value of the evaluation function, and $N(0, \sigma_i)$ indicates that an average is '0' and $\sigma_i$ is a random number having a gaussian probability distribution.

The above equation means that when an output error between the output from the system and the output mathematically calculated is large, a varying range of the random numbers is widened, resulting in having a higher probability of generating an offspring different from a present parent individual.

In the case of the evolution strategy, a mutation operator having the following equation is used.

$$\sigma'_i = \sigma_i \exp(\tau N(0,1) + \tau' N_i(0,1))$$

$$\vec{z'}_i = \vec{z}_i, \sigma'_i N(0,1), i=1, \ldots, N_p$$

Here, $N(0,1)$ as a proportional constant determining the size of $\sigma_i$ means that an average is '0' and a standard deviation is '1'.

Then, in the fourth step (s4), each evaluation function is calculated and scored by using given evaluation samples with respect to the offspring individual s generated in the third seep.

In the fifth and sixth steps, in the case of the evolution strategy, a new generation is obtained by selecting excellent $N_p$ individual s having the minimum evaluation function by arranging in order with respect to $2N_p$ individual s, and in the case of the evolutionary programming, when the value of the evaluation function is small in comparison with predetermined individual s at random and the small value is set as 'win' to count each multiplier factor (s75), the individual s having many wins are selected to form a new generation. (s76)

In the case of the genetic algorithm, a probability selected in proportion to the size rate of the evaluation function of each individual with respect to the sum of the evaluation function of each individual is determined (s85), and by the above probability, an individual is selected to form a new generation which is an offspring (s86), and thereby, an excellent individual is selected, resulting in a new generation.

In the seventh step, the individual selected in the step 6 (s76) (s86) is judged whether or not it is satisfactory or not. As a result, if it is satisfactory, the step is finished, but if it is not, the step 3 (s3) is repeated until the satisfactory individual is obtained.

As described in detail above, a signal for reducing a minimized error is inputted to the second adder 225 in the proportional-derivative controller 220 to offset the friction.

Accordingly, a control input Du (k) finally applied to the system results from the sum of a proportional-derivative control input and a friction-compensated control input.

As described in detail above, the present invention performs a position control by generating a fuzzy regulation in an evolutionary computation and a precise position control is carried out in a shorn time by estimating the friction in the evolutionary computation.

Further, the conventional control input technique may be used instead of the proportional-derivative control input Du (k) applied to the system according to the present invention; for example, conventional feedback control techniques such as a proportional control, a proportional-derivative control, or a proportional-derivative-integral control which are widely used in an industry, or a modern control technique such as an adaptive control, or a variable structure control. Therefore, the friction compensator can be utilized with a variety of conventional control devices, which makes it possible to be widely used.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A position control apparatus for a machine tool, comprising:

a pre-unit fuzzy compensator for outputting a fuzzy-compensated signal according to an evolutionary computation algorithm after obtaining an error and a rate of a change of the error from a positional feedback output signal from a machine tool positioning system;

a proportional-derivative controller for carrying out a proportional-derivative control and outputting a torque value after obtaining an error from an output signal from the pre-unit fuzzy compensator and the output signal from the system; and an actuator for multiplying the torque value by a predetermined coefficient to obtain a control signal and outputting the control signal to the system.

2. The apparatus of claim 1, wherein the pre-unit fuzzy compensator comprises:

a first subtractor for obtaining an error between an input positioning signal and the output signal from the system;

a fuzzy controller for performing a fuzzy control and outputting a compensating value according to an evolutionary computation algorithm after determining a rate of change of the error;

a delay for delaying the compensating value from the fuzzy controller for one sampling period;

a first adder for adding the compensating value from the fuzzy controller to the compensating value delayed by the delay; and a second adder for adding an output from the first adder and the input positioning signal to output a new compensating signal to the proportional-derivative controller.

3. The apparatus of claim 1, wherein the proportional-derivative controller comprises:

a second subtractor for obtaining an error between the output signal from the system and a compensating signal from the pre-unit fuzzy compensator;

an amplifier for multiplying the compensating signal by a gain;

a proportional differentiator for obtaining a rate of change of the error from the error and control signals by performing a proportional derivative control; and a third adder for adding an output from the amplifier to the control signal to obtain the torque value for a positional control.

4. A position control apparatus for a machine tool, comprising:

a pre-unit fuzzy compensator for outputting a fuzzy-compensated signal according to an evolutionary computation algorithm after obtaining an error and a rate of change of the error from an input positioning signal and an output positional feedback signal from a machine tool positioning system;

a proportional-derivative controller for carrying out a proportional-derivative control and outputting a torque value after obtaining an error from an output signal from the pre-unit fuzzy compensator and the output signal from the system; and a friction compensator for receiving the output signal from the system to operate a parameter with respect to friction, estimating friction of the system from the parameter according to the evolutionary computation algorithm and compensating for it; and an actuator for multiplying torque value outputted from the friction compensator by a predetermined coefficient to obtain a control signal and applying the control signal to the system.

5. The apparatus of claim 4, wherein the friction compensator comprises:

a parameter estimating unit for estimating a parameter of the friction: and a friction controller for comparing an estimated output from the system calculated by the friction determined by the estimated parameter and an actual output from the system to output a signal for reducing an error generated by the comparison result.

6. The apparatus of claim 6, wherein the parameter estimating unit models the friction from a movement equation and from the modeled friction, estimates the eight parameter vectors:

$$z=[m, F_c, F_v, F_s, F_{s,oo}, k_\tau, x_s, \tau_L, \gamma]^T, z\in\mathbb{R}^8$$

wherein m represents an equivalent mass of a moving portion, $F_c$ a coulomb friction, $F_v$ a viscous friction, $F_s$ a Stribeck friction, $F_{s,a}$ a Stribeck friction of a static moment, $F_{s,oo}$ a Stribeck friction after a long static condition, $k_\tau$ a stiffness in a static condition, $x_s$ a characteristic speed of the Stribeck friction, $\tau_L$ a friction delay time, $t_2$ a dwell time and $\gamma$ a parameter of an increasing static friction.

* * * * *